Jan. 20, 1925.  1,523,406
J. DEMARCO
AIR BRAKE MECHANISM
Filed Jan. 12, 1924
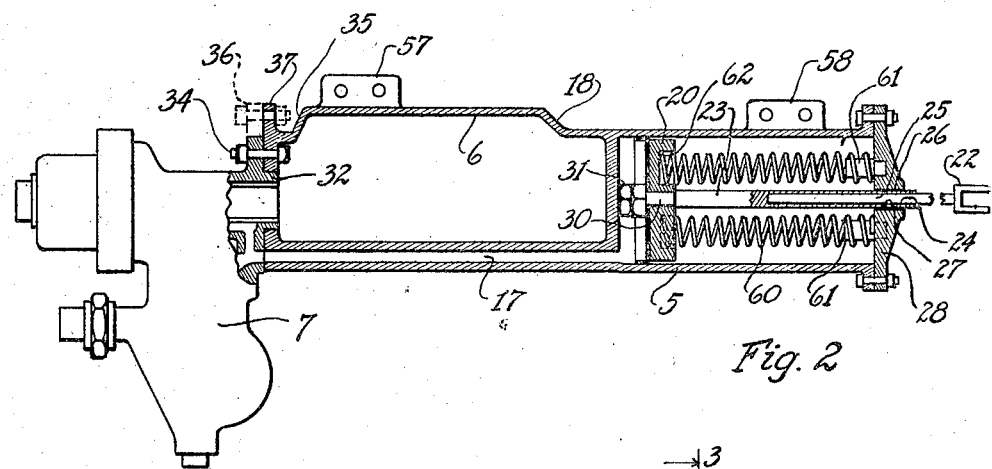
Fig. 2
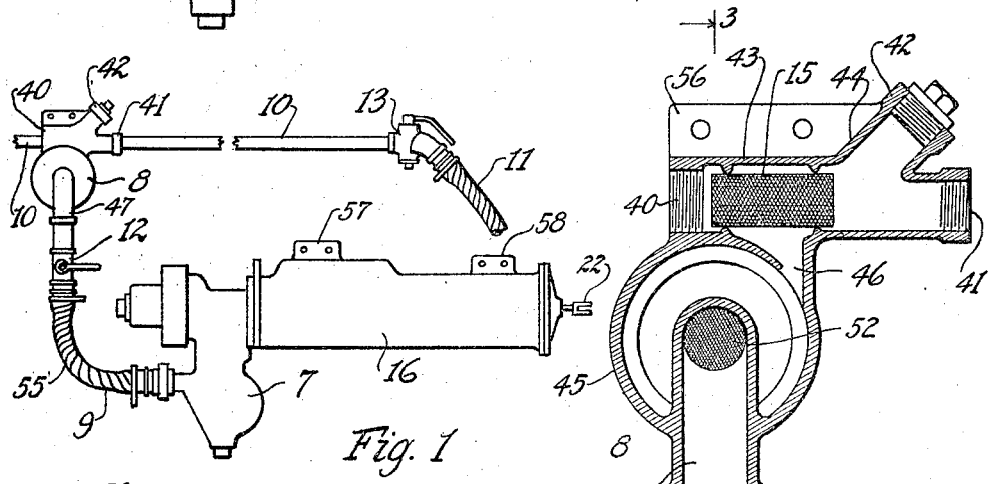
Fig. 1
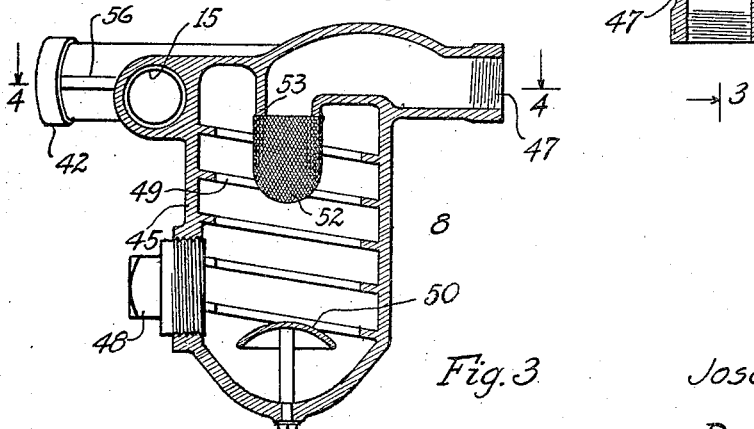
Fig. 3
Fig. 4
INVENTOR:
Joseph Demarco
By E J Andrews
Atty.

Patented Jan. 20, 1925.

1,523,406

UNITED STATES PATENT OFFICE.

JOSEPH DEMARCO, OF KOLZE, ILLINOIS.

AIR-BRAKE MECHANISM.

Application filed January 12, 1924. Serial No. 685,774.

*To all whom it may concern:*

Be it known that I, JOSEPH DEMARCO, a citizen of the United States, residing at Kolze, in the county of Cook and State of Illinois, have invented certain new and useful Improvements in Air-Brake Mechanism, of which the following is a specification.

This invention relates to air-brakes particularly with reference to air-brakes used on steam and electric railroads. The invention has for its object providing a simple and very effective air-brake mechanism by materially modifying certain parts of the air-brake mechanisms which are in general use. Other objects of the invention will be apparent upon a consideration of the accompanying drawings and the following description thereof.

Of the drawings Fig. 1 is a plain view of an air-brake mechanism which embodies the features of my invention; Fig. 2 is an enlarged central sectional view of the brake cylinder and auxiliary reservoir therefor. Fig. 3 is a central sectional view of a dust collector of the system, along the line 3—3 of Fig. 4; Fig. 4 is a sectional view along the line of 4—4 of Fig. 3.

The portion of the air-brake mechanism to which I have shown my invention as applied comprises the air-brake cylinder 5, the auxiliary reservoir 6, to which is attached an ordinary triple valve 7, and the dust collector 8 together with my connecting pipe 9, and the ordinary pipes 10 and 11, cut-out cock 12, and angle cock 13.

Ordinarily the cylinder 5 and the reservoir 6 are either entirely separated or have distinct casings which are in some manner connected together. I provide, however, a single casing 16 for both the cylinder 5 and reservoir 6 so that it is unnecessary to connect them in any way when assembling or installing, and the jarring of the car cannot loosen the connecting bolts, cause leakage or otherwise disable the elements. In connection with this modification, I provide the combined casing of cast iron or steel and provide in the wall of the reservoir 6 a passageway 17 by means of which the air is transmitted from the triple valve 7 to the cylinder 5 when the brakes are to be applied. My invention comprises the ordinary triple valve 7, and it will be understood that this valve allows the air to pass into the passageway 17 at proper times. In order to provide the passageway 17 in the wall of the reservoir, I provide the offset 18 in the wall so as to allow the passageway 17 to open into the cylinder.

Within the cylinder 5, I provide a piston 20 having a piston rod 23 to the outer end of which is fixed a fork 22 or other suitable means for connecting the piston stem with the ordinary braking mechanism. The piston rod 23 of the stem has a bore 24 extending substantially halfway through the rod which is adapted to receive a rod 25 to which is fixed the fork 22. The sleeve 26 of the stem passes through the opening 27 of the end plate 28 of the cylinder, so that the entire piston stem is at liberty to move outwardly through the opening 27 sufficiently to set the brakes. The inner end of the rod 23 has a reduced portion 30 which passes through the piston 20 and is held therein by means of the nut 31.

The valve end of the reservoir 6 is adapted to receive the ordinary type of triple valve 7 by means of an opening 32 in the end plate but I provide in this end plate openings for receiving bolts 34 for bolting the triple valve to the end plate. To prevent the bolts from turning I provide the inwardly projecting shoulder 35. By placing the bolts 34 in the openings of the end plate the valve 7 may be firmly bolted to the end plate, and I thus prevent the danger of the bolts, which are ordinarily screwed into the end plate, from breaking off when the elements are to be separated. However, in order to more conveniently connect the triple valve to the end of the reservoir, when suitable flanges 36 are provided on the triple valve, I provide the flange 37 and openings therein for receiving bolts, and in such a case the necessity of inserting the bolts 34 within the cylinder is avoided and the assembling is more conveniently carried out.

A part of my invention comprises a modification of the ordinary systems for assembling the dust collector 8 and the casing of the strainer 15. In order to prevent any breakage or leakage of these parts, or the jarring or shifting of the various elements, I provide a combination element illustrated in Fig. 4 which comprises the dust collector 8, the connections 40, 41 and 42 for the air pipes, and the casing 43 for the strainer, all integrally formed from cast iron or steel. By the use of this compound member all connecting means are eliminated and the danger of breakage is very materially lessened and the danger of leakage is substantially eliminated. This compound element is connected with the ordinary airpipes 10, and in order to provide for running this pipe to the opposite side of the car I provide a 45 degree angle T 44 integral with the compound element. I thus provide two points of connection 41 and 42, either one of which may be used and the other plugged depending upon where the main airpipe is to go from that point. In the compound element I provide an ordinary form of strainer 15 through which all air must pass to the dust collector 8 and hence to the local brake cylinder 5 and reservoir 6.

I also provide the special form of dust collector 8, which, as explained, is integral with the strainer casing and pipe connectors. This dust collector comprises a cylindrical casing 45 into which the air passes from the main pipe through the opening 46 and from which the air passes to the reservoir 6 through an outlet 47 to which is connected the cut-out cock 12. The air passing into the casing 45 passes downwardly into the casing and as the casing is materially enlarged the velocity of the air therein is materially decreased and the dust in the air settles, as is common with ordinary types of dust collectors, in the bottom of the casing and beneath the retaining member 50. An opening is formed in the side of the casing 8 in which a plug 48 is inserted. When it is desired to remove the dust from the bottom of the casing the plug may be removed.

In order to more completely remove the dust from the air which is passing into the braking mechanism, I provide spiral ribs 49 which force the air downwardly as it enters the casing carrying with it any entrained dust and the dust is forced outwardly by centrifugal action against the wall of the casing and is pushed downwardly along the spiral flanges and into the bottom of the casing, while the air works inwardly away from the spiral flanges and upwardly into the outlet 47.

In this manner I provide a very effective dust collector, but in order to more thoroughly eliminate all dust from the braking mechanism I provide a strainer 52 which is connected to the inner end 53 of the outlet 47. This strainer is placed in a position where the air passing into and out of the dust collector and around the walls thereof is continually forcing the dust off from the walls of the strainer. Not only is the strainer positioned with reference to the air currents so that air is driven through from one side to the other continually, but also air passes more or less into and out of the inlet through the strainer owing to the action on the air of the triple valve. When the valve closes the passageway the air bounds back through the strainer 52 forcing the dust therefrom. So that clogging of the strainer is substantially eliminated. But as a further precaution the strainer is so placed that it can be easily reached and cleaned by removing the plug 48, or it may be entirely replaced without inconvenience if necessary.

In order to still further reduce the danger of breakage or leakage owing to the shifting of the car or the relative movement of the various parts of the air-brake system, I provide a flexible tube 9 for connecting the dust collector with the triple valve; and to prevent injury to this tube I enclose it in bands 55 of metal. In order to provide suitable and convenient means for connecting the elements to the beams of the car I provide integral with the compound casing of Fig. 4, a flange 56 by means of which the casing may be bolted to the beams; and on the casing 16 I provide flange 57 and 58 for a similar purpose. In this manner the elements may be very firmly and rigidly fixed to the beams so as to reduce the tendency of the chief elements to move relatively and to reduce the tendency of the elements to become separated from the frame work.

Although any ordinary spring means may be used for returning the piston to its initial position after the brake has been operated and released, yet I prefer for the purpose a plurality of springs 60 positioned between the piston and the end of the cylinder. The outer ends of these springs are held in place by means of pins 61, and the inner ends are held in position by means of recesses 62 in the piston. By this arrangement the springs may be readily removed from the cylinder by detaching the end plate and slipping it outwardly until the pins 61 pass out from the springs, when a broken spring may be readily removed and another one inserted, it being unnecessary to slip the spring off from the piston rod as is common.

I claim as my invention:

1. In an air-brake mechanism, an integral casing, comprising an air-brake cylinder and an auxiliary reservoir, a single wall separating said reservoir, and valve controlling means for passing compressed air from said reservoir to said cylinder.

2. In an air-brake system an auxiliary reservoir, and an air-brake cylinder integral with said reservoir, said reservoir having on one side thereof a hollow wall forming an air tight passageway, one end of said passageway opening into said cylinder, and valve mechanism operatively connecting the other end of the passageway with said reservoir.

3. In an air-brake mechanism an air-brake cylinder, a piston mounted in said cylinder, means operatively connecting said piston with a wheel-brake of the mechanism, and a plurality of compression springs positioned in said cylinder between the said piston and the end of said cylinder, a pin fixed to the end plate of said cylinder and projecting into each of said springs, and the piston having a plurality of recesses thereon into each of which one of said springs projects.

4. In an air-brake mechanism an auxiliary reservoir and means fixed to one end of said reservoir for attaching to the reservoir a valve mechanism, said means comprising a shoulder projecting inwardly from the wall of said reservoir and an opening positioned adjacent to said shoulder and adapted to receive a bolt rotation of which is prevented by said shoulder.

5. In an air-brake mechanism an integral member comprising a strainer casing having an air inlet therein, and a cylindrical dust collector, said collector having an inlet therein substantially tangential with the inner wall of said dust collector, said inlet being connected with said strainer casing and said dust collector having an outlet thereon and a strainer mounted in said outlet.

6. In an air-brake mechanism, an integral member comprising a strainer casing and a dust collector casing, said member having a passageway connecting said casings, said strainer casing having two openings on opposite sides thereof and having a passageway at a material angle with a line connecting said two openings.

7. In an air-brake mechanism, a dust collector, said collactor having an air inlet substantially tangential with the inner surface of the wall of said collector, and said collector having an outlet in the upper central portion thereof and having an opening in the normally vertical wall of said collector, and closing means detachably mounted in said opening.

8. In an air-brake mechanism, a dust collector, said collector having an air inlet substantially tangential with the inner surface of the wall of said collector, and said collector having an outlet in the upper central portion thereof and having an opening in the normally vertical wall of said collector adjacent the bottom thereof and materially below said outlet, and closing means detachably mounted in said opening and a strainer fixed to said outlet.

9. In a pneumatic air system, a dust collector comprising a cylindrical casing, said casing having an air inlet, the axis of said inlet being substantially tangential with the inner surface of the wall of said casing and at the upper end thereof, said casing having an outlet in the central portion of its upper end, and spiral ribs projecting inwardly from the wall of said casing.

10. In an air-brake mechanism, an integral member comprising a strainer casing and a dust collector, a second integral member comprising an auxiliary reservoir and an air-brake cylinder, and a flexible tubing connecting said two integral members, said tubing having a flexible armor thereon.

In testimony whereof, I hereunto set my hand.

JOSEPH DEMARCO.